United States Patent
Beaujot (10) Patent No.: US 8,453,754 B2
(45) Date of Patent: Jun. 4, 2013

(54) AGRICULTURAL IMPLEMENT SKEW DETECTION AND CORRECTION

(75) Inventor: Norbert Beaujot, Regina (CA)

(73) Assignee: Straw Track Manufacturing Inc., Saskatchewan (CA)

( * ) Notice: Subject to any disclaimer, the term of this patent is extended or adjusted under 35 U.S.C. 154(b) by 317 days.

(21) Appl. No.: 12/805,639

(22) Filed: Aug. 11, 2010

(65) Prior Publication Data

US 2011/0036281 A1    Feb. 17, 2011

(30) Foreign Application Priority Data

Aug. 12, 2009  (CA) .................................... 2678601

(51) Int. Cl.
| | |
|---|---|
| *A01B 63/1112* | (2006.01) |
| *A01B 63/1115* | (2006.01) |
| *A01B 69/004* | (2006.01) |
| *A01B 69/008* | (2006.01) |
| *A01B 79/005* | (2006.01) |
| *E02F 9/2029* | (2006.01) |
| *E02F 9/2037* | (2006.01) |
| *E02F 9/2041* | (2006.01) |
| *E02F 9/2228* | (2006.01) |
| *E02F 9/225* | (2006.01) |

(52) U.S. Cl.
    USPC ..................... 172/2; 172/7; 701/50

(58) Field of Classification Search
    USPC .... 172/2, 7–12, 239; 701/50, 1; 280/441–445
    See application file for complete search history.

(56) References Cited

U.S. PATENT DOCUMENTS

| | | | | | |
|---|---|---|---|---|---|
| 2,228,968 | A | * | 1/1941 | Miller | ............................. 407/27 |
| 2,841,067 | A | * | 7/1958 | Magarian | .......................... 172/7 |
| 3,039,033 | A | * | 6/1962 | Benton | ......................... 318/675 |
| 3,115,192 | A | * | 12/1963 | Bushmeyer | .................. 172/166 |
| 3,166,023 | A | * | 1/1965 | Lynd, Jr. | .................... 105/163.2 |
| 7,147,241 | B2 | | 12/2006 | Beaujot | |

* cited by examiner

*Primary Examiner* — Christopher J Novosad
(74) *Attorney, Agent, or Firm* — Nixon & Vanderhye P.C.

(57) ABSTRACT

A system for correcting skewing in an agricultural implement where the implement includes a plurality of ground engaging tools laterally spaced across a width of the implement and operative to selectively engage the ground to perform a desired operation on a field surface has a skew detecting device operative to sense when the implement is travelling in a skewed orientation and send a correction signal indicating the skewed orientation to a correction mechanism. A drag force is exerted on the ground engaging tools by engagement with the ground when performing the desired operation on the field surface, and the correction mechanism is operative to change the drag forces exerted on at least some ground engaging tools on one side of the implement to correct the skewed orientation.

20 Claims, 4 Drawing Sheets

AGRICULTURAL IMPLEMENT SKEW DETECTION AND CORRECTION

This invention is in the field of agricultural implements and in particular detecting and correcting skewing of an agricultural implement where the implement travels at a non perpendicular angle with respect to the operating travel direction.

BACKGROUND

Seeding implements typically comprise a plurality of furrow openers mounted on an implement frame. The furrow openers are spaced laterally across the width of the implement in generally parallel opener rows extending perpendicular to the operating travel direction. The openers are typically mounted in opener rows on horizontal frame members that are oriented perpendicular to the operating travel direction. There are typically three or four opener rows spaced from the front of the implement to the rear thereof. When the implement is travelling in the operating travel direction the opener rows are perpendicular to the operating travel direction, and the furrows made by the openers are thus parallel to each other and equally spaced across the width of the implement at the designed furrow spacing.

Thus in order to maintain the correct furrow spacing, the implement must move in the operating travel direction in such a manner that the opener rows are perpendicular to the travel direction. Often however uneven forces acting on the implement cause the implement to skew, such that the opener rows are at an angle to the operating travel direction that is not perpendicular, but inclined in one direction or the other. These forces are caused by unequal soil conditions across the width of the implement, uneven ground penetration of ground engaging tools on the implement, uneven wear on ground engaging tools, by gravity when travelling on hill sides, and like conditions. While some of these forces are relatively constant, most are constantly changing. Such skewing has the undesirable effect of altering the furrow spacing.

The spacing of the furrow opener on each opener row of course stays the same, but as the opener rows incline with respect to the travel direction the lateral spacing of the furrows made by the openers on the same row will decrease somewhat. This is not usually significant however the lateral location of the furrow openers on the rear rows can change significantly with respect to the lateral location of the furrow openers on the front rows. The longer the distance between the front opener row and the rear opener row, the greater the change in the spacing of the furrows made by the furrow openers on the front opener row and those made by openers on the rear opener row. Spacing increases between some furrows and decreases between others.

Such skewing also causes the implement to travel offset from the centerline of the tractor, such that when making back and forth passes across a field, the implement is offset with respect to the tractor. Thus when using a Global Positioning System (GPS) guidance system, or automatic steering system that guides the tractor, such skewing will cause an overlap going one way and a miss going the other way. Between row seeding as described in the present inventor's U.S. Pat. No. 6,553,925 is also problematic when excessive skewing occurs.

While skewing is a particular concern with seeding implements, row crop cultivation requires accurate guiding of ground engaging tools such as cultivator shovels, blades, and discs, and similar problems arise when these implements travel in a skewed orientation.

The problem has been addressed in U.S. Pat. No. 7,147,241 to Beaujot et al. In the Beaujot system a sensor member is located in about the middle of the furrow openers on the implement. The sensor is shown as a wheel that rolls in the operating travel direction. The wheel is mounted on a trailing arm that pivots at a front end thereof about a vertical axis. Thus when the arm is positioned at a 90 degree angle relative to the horizontal bars of the implement frame to which the furrow openers are mounted, it is considered to be in the neutral position and the seeding implement is in alignment with no skew. If the implement skews, the horizontal bars incline from the perpendicular orientation and the sensor detects this skew and sends a steering signal to steerable rear wheels on the implement which steer the rear end of the implement to one side or the other to correct the skew. Such steering wheels add significantly to the cost and complexity of the implement.

Skew is also corrected using heavy coulter discs or coulter wheels which are oriented to roll in the operating travel direction and penetrate the soil such that the discs exert a force against the soil that resists lateral movement and thus reduces skewing. These coulters can also be oriented at an angle to the operating travel direction and moved up and down into the soil as needed to correct skew, in much the same manner as with the steering implement wheels of Beaujot. Such an angled vertically movable coulter on each side of the implement can move the implement laterally in either direction to correct skew. These coulters disturb the soil in a manner that is undesirable in minimum and no tillage farming operations.

It is also known to detect skew by using two GPS sensors one located forward and one rearward on the implement or tractor and implement. The sensors are aligned in the operating travel direction and when skew occurs this alignment changes and the sensors are no longer following the same path. This deviation is detected and a correction signal can be sent to correction mechanisms such as the steering wheels or coulters described above.

The known means for detecting and correcting implement skewing are relatively costly and complex, and have undesirable consequences for some farm operations.

SUMMARY OF THE INVENTION

It is an object of the present invention to provide a system for skew detection and correction for seeding implements that overcomes problems in the prior art.

In a first embodiment the present invention provides a system for correcting skewing in an agricultural implement where the implement includes a plurality of ground engaging tools laterally spaced across a width of the implement and operative to selectively engage the ground to perform a desired operation on a field surface. The system comprises a skew detecting device operative to sense when the implement is travelling in a skewed orientation and send a correction signal indicating the skewed orientation to a correction mechanism. A drag force is exerted on the ground engaging tools by engagement with the ground when performing the desired operation on the field surface, and the correction mechanism is operative to change the drag forces exerted on at least some ground engaging tools on one side of the implement to correct the skewed orientation.

In a second embodiment the present invention provides an agricultural seeding implement apparatus comprising an agricultural seeding implement comprising a plurality of furrow opener assemblies laterally spaced across a width of the implement and operative to selectively engage the ground such that the furrow opener assemblies form furrows in the ground, and a distribution system operative to deposit an agricultural product into each furrow. A drag force is exerted on the furrow opener assemblies by engagement with the ground. A skew detecting device is operative to sense when the implement is travelling in a skewed orientation and send a correction signal indicating the skewed orientation, and a correction mechanism is operative to receive the correction signal and is operative to change drag forces exerted on at least some furrow opener assemblies on at least one side of the implement to correct the skewed orientation.

In a third embodiment the present invention provides a method of correcting skewing in an agricultural implement where the implement includes a plurality of ground engaging tools laterally spaced across a width of the implement, and where the ground engaging tools are operative to selectively engage the ground to perform a desired operation on a field surface. The method comprises engaging the ground engaging tools in the ground to perform the desired operation such that a drag force is exerted on the ground engaging tools by engagement with the ground; detecting when the implement is travelling in a skewed orientation and sending a correction signal indicating the skewed orientation, and receiving the correction signal and in response, changing the drag forces exerted on at least some ground engaging tools on one side of the implement to correct the skewed orientation.

In a fourth embodiment the present invention provides an apparatus for detecting skewing in an agricultural implement where the implement includes a ground engaging tool mounted on a front portion thereof and operative to create a furrow in a ground surface. The apparatus comprises a furrow sensor mounted on a rear portion of the implement rearward of the ground engaging tool such that when the implement is travelling in a desired operating orientation the furrow sensor is in an aligned position where the furrow sensor is aligned in an operating travel direction of the implement with the front furrow opener. The furrow sensor is operative to detect the furrow and send a skew correction signal when the furrow sensor detects that the rear portion of the implement is laterally displaced from the furrow compared to the aligned position.

The skew correction system of the invention thus uses existing ground engaging tools of the implement to correct the skewed orientation, and does not require complex and costly steering wheels or added coulter wheels. By detecting the skewed orientation and then varying the drag forces exerted on the ground engaging tool by the ground, such as by slightly varying the depth of penetration of some of the ground engaging tools, the skew can be corrected simply and economically.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
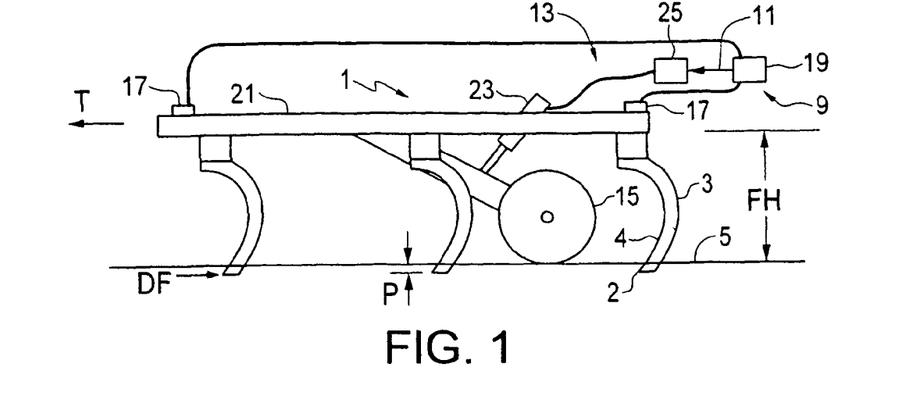
FIG. 1 is a schematic side view of an agricultural implement where the depth of penetration of the ground engaging tool is varied by changing the height of the implement frame with respect to the ground, and with an embodiment of the system for correcting skewing of the present invention installed thereon.
Figure 2:
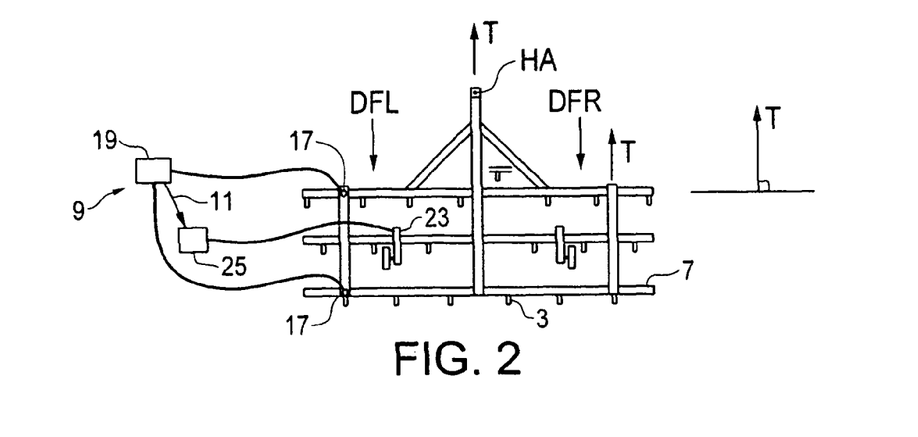
FIG. 2 is a schematic top view of the implement of FIG. 1 travelling in a desired orientation where the cross members and the rows of ground engaging tools mounted thereto are perpendicular to the operating travel direction.
Figure 3:
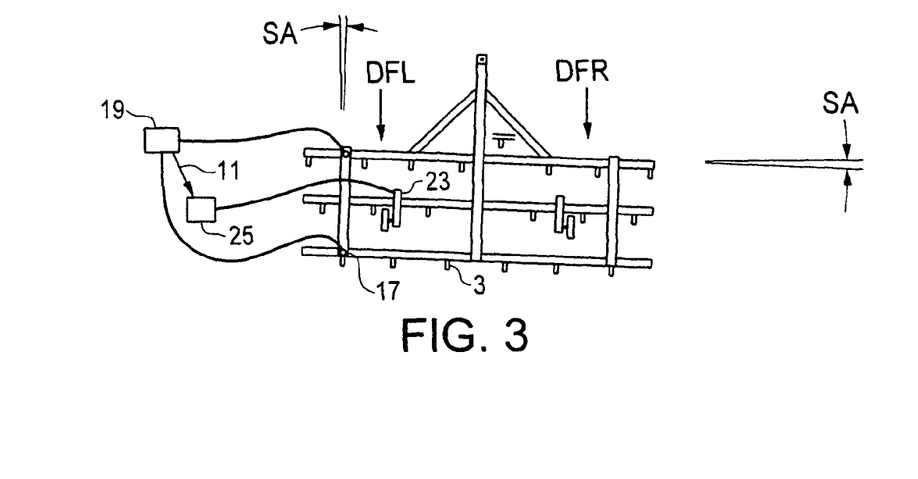
FIG. 3 is a schematic top view of the implement of FIG. 1 travelling in a skewed orientation.

FIGS. 1-3 schematically illustrate an agricultural implement 1 and a system of the present invention for correcting skewing in such an implement 1. The implement 1 includes a plurality of ground engaging tools 3 laterally spaced across a width of the implement 1 and operative to selectively engage the ground 5 to perform a desired operation on a field surface, such as cultivation, seeding, fertilizing, or the like. The illustrated ground working tool 3 comprises a blade 2 or the like mounted on the bottom end of a shank 4. A drag force DF is exerted on the ground engaging tools 3 by engagement with the ground 5 when the tools 3 are performing the desired operation on the field surface.

FIG. 2 schematically illustrates the implement 1 travelling in a desired orientation where the cross members 7 to which the ground engaging tools 3 are mounted, are perpendicular to the operating travel direction T. FIG. 3 schematically illustrates the implement 1 travelling in a skewed orientation where the cross members 7, are oriented at a skew angle SA compared to the desired orientation of FIG. 2.

The illustrated embodiment of the system for correcting skewing comprises a skew detecting device 9 operative to sense when the implement 1 is travelling in a skewed orientation and send a correction signal 11 indicating the skewed orientation to a correction mechanism 13. The correction mechanism 13 is operative to change the drag forces DF exerted on at least some ground engaging tools 3 on one side of the implement 1 to correct the skewed orientation.

In operation, the drag force DF exerted on the ground engaging tools 3 can vary significantly, and so the sum DFR of the drag forces DF exerted on the ground engaging tools 3 on the right side of the implement 1 may not be equal to the sum DFL of the drag forces DF exerted on the ground engaging tools 3 on the left side of the implement 1. Smaller imbalances in the draft forces are resisted by the wheels 15 that support the implement 1 for travel along the ground. The wheels 15 are oriented to roll in the operating travel direction T and so resist smaller forces which tend to skew them.

These unbalanced forces can often increase however, due to uneven soil conditions across the width of the implement, uneven ground penetration of the tools 3, and like variances. As well when the implement 1 is travelling on a hill side, gravity will draw the implement 1 down the slope of the hill. In any event these unbalanced forces can overcome the resistance of the rolling wheels 15 and cause the implement to pivot about the vertical hitch pivot axis HA where the implement 1 attaches to a tractor and travel in the skewed orientation of FIG. 3. In some extreme cases the towing tractor will be pulled into a skewed orientation as well as the towed implement 1, but for the most part skewing is caused by forces pulling on the implement 1 and causing same to pivot about the hitch axis HA.

In the illustrated system the skew detecting device 9 is provided by two GPS location sensors 17, one located forward and one rearward on the implement 1. Typically the forward sensor 17 will be mounted on a tractor towing the implement and the rearward sensor 17 on a rear portion of the implement, however the illustrated arrangement would work as well, and is used to simplify the illustration of the operation of the skew detecting device 9. The sensors 17 are aligned in the operating travel direction T when in the desired orientation of FIG. 2, and a processor 19 is connected to each sensor 17. When skew occurs, such as illustrated in FIG. 3, this alignment changes and the sensors 17 are no longer following the same path. The processor 19 detects this deviation and sends the correction signal 11 to the correction mechanism 13.

It is contemplated that other known skew detecting devices could be used as well, such as that described above and in U.S. Pat. No. 7,147,241 to Beaujot.

One way to change the drag forces DF exerted on ground engaging tools 3 on one side of the implement 1 is to vary the depth of ground penetration P of some ground engaging tools 3. The illustrated implement 1 is of the type where the depth of ground penetration P of the ground engaging tools 3 is adjusted by adjusting a height FH of the frame 21 of the implement 1 with respect to the ground 5. The wheels 15 are moved up and down by hydraulic cylinders 23. The correction mechanism 13 in the illustrated system is then provided by a controller 25 connected to the hydraulic cylinder 23 that operates the wheel 15 on one side of the implement 1.

In FIG. 3, whether because of gravity, soil conditions, or for whatever reason, the left side of the implement 1 is ahead of the right side and so, conceptually, the left side must be "pulled rearward", or the right side "pushed forward", to return the implement to the desired orientation of FIG. 2. Since the correction mechanism 13 illustrated is connected to operate on the left side of the implement 1, the correction mechanism 13 acts in such a manner that the left side is "pulled back" by increasing the sum DFL of the drag forces exerted on the ground engaging tools 3 on the left side of the implement 1. In the illustrated system then the controller 25 operates the hydraulic cylinder 23 to lower the frame height FH on the left side of the implement 1, increasing the depth of ground penetration P of the tools 3 on the left side, and thereby increasing the sum DFL' of the drag forces exerted on the ground engaging tools 3 on the left side of the implement 1, pulling the left side of the implement rearward and correcting the skew.

Alternatively if the correction mechanism 13 was connected to operate on the right side of the implement 1, the frame height FH could have been increased to reduce the depth of ground penetration of the tools 3 on the right side, and reduce the right hand drag forces DFR such that the sum DFL of the drag forces exerted on the ground engaging tools 3 on the left side of the implement 1 becomes greater than those on the right side, again "pulling" the left side of the implement 1 rearward.

Figure 4:
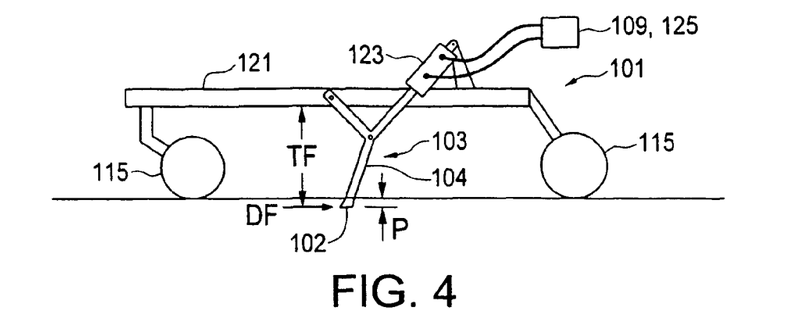
FIG. 4 is a schematic side view of an alternate agricultural implement where the depth of penetration of the ground engaging tool is varied by changing the height of the ground engaging tools with respect to the implement frame, and with an embodiment of the system for correcting skewing of the present invention installed thereon.

FIG. 4 illustrates an alternate agricultural implement 101 of the type where the wheels 115 supporting the implement frame 121 are fixed with respect to the frame and the ground engaging tool 103 is movably mounted to the implement and comprises a shank 104 pivotally attached to the frame 121, and a blade 102 or the like at a bottom end thereof. The depth of ground penetration P of the ground engaging tool 103 is adjusted by adjusting a height TF of the ground engaging tool 103 with respect to the implement frame 121 by extending or retracting hydraulic cylinder 123. The correction mechanism 109 in this type of implement comprises a hydraulic controller 125 connected to a number of hydraulic cylinders 123 on one side of the implement. In response to a correction signal from a skew detection device, the hydraulic controller 125 raises and lowers the connected ground engaging tools 103 with respect to the implement frame 121 to change the drag forces DF on the tools 103.

It is contemplated that it will only be necessary to change the depth of penetration P by a small amount, such that the field operation being done by the ground engaging tools will not be noticeably affected. It will be seen that the larger the number of ground engaging tools that are affected by the correction mechanism, the less the depth of ground penetration of each tool will need to change in order to change the total draft forces on the one side to correct the skew.

It can also be seen that the farther away from the center of the implement the change in draft force is exerted, the greater will be the affect on the skew angle. A force acting on an outer end of the implement 1 acts through a longer moment arm and thus will exert a greater torque about the hitch axis HA in the desired correction direction.

Figure 5:
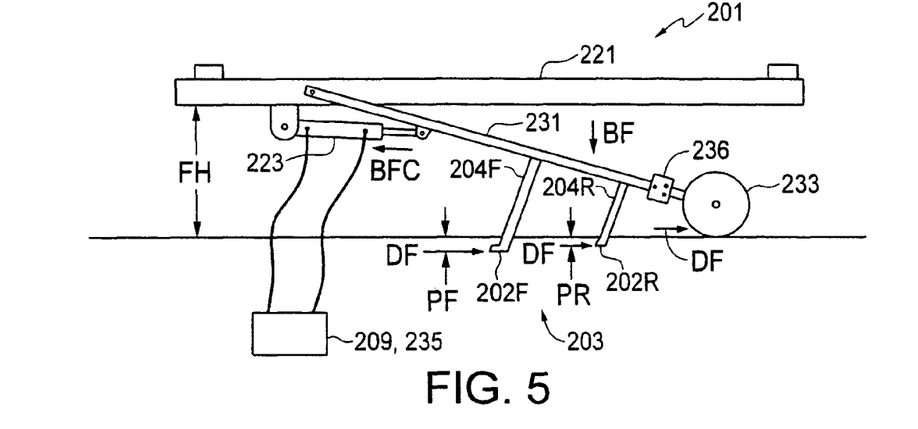
FIG. 5 is a schematic side view of a further alternate agricultural implement where the ground engaging tools comprise a tool assembly with a trailing arm pivotally attached to the implement at a front end thereof, a packer wheel mounted on a rear end of the trailing arm, and a furrow opener mounted on the trailing arm forward of the packer wheel, and wherein a bias element is operative to exert a downward bias force on the trailing arm, and with an embodiment of the system for correcting skewing of the present invention installed thereon.

In still another type of implement, a trailing arm type seeding implement 201 such as illustrated in FIG. 5, the ground engaging tool 203 is a furrow opener assembly with a trailing arm 231 pivotally attached to the implement frame 221 at a front end thereof, a packer wheel 233 mounted on a rear end of the trailing arm 231, and a furrow opening ground engaging tool 203 mounted on the trailing aim 231 forward of the packer wheel 233. The illustrated embodiment of the furrow opening ground engaging tool 203 is of the type comprising front and rear shanks 204F, 204R and furrow forming elements 202F, 202R mounted at bottom ends thereof. A bias element, hydraulic cylinder 223, is operative to exert a downward bias force BF between the implement frame 221 and the ground engaging tool 203 by exerting the cylinder bias force BFC on the trailing arm 231. The bias force BF forces the furrow forming elements 202F, 202R of the ground engaging tool 203 into the ground and forces the packer wheel 233 against the ground.

The hydraulic cylinder 223 is connected to an active hydraulic source 235. The pressure of the hydraulic source 235 is controlled and selected to provide a desired bias force BF on the arm 231 to provide ground penetration and packing force that is suitable for the soil conditions of the field where the implement is operated. Hydraulic fluid can move into and out of the hydraulic cylinder allowing the hydraulic cylinder 223 to extend and retract in response to ground contours which vary the relative position of the packer wheel 233 and implement frame 221 such that the packer wheel 233 moves up and down with respect to the frame 221.

Conveniently correction mechanism 209 is operative to increase and decrease the bias force BF on the trailing arm 231 by varying the pressure of the hydraulic source 235. When the pressure is increased the downward bias force BF increases and the packer wheel 233 is pushed downward and the furrow forming elements 202F, 202R move slightly farther into the ground increasing the depth of ground penetration PF, PR. Often the packer wheel 233 has a pneumatic tire so that increasing the bias force deforms the tire somewhat increasing the rolling resistance force while also allowing the furrow forming elements 202F, 202R to penetrate deeper. In any event increasing or decreasing the hydraulic pressure has the effect of increasing or decreasing the drag forces DF on the ground engaging tool 203.

Figure 6:
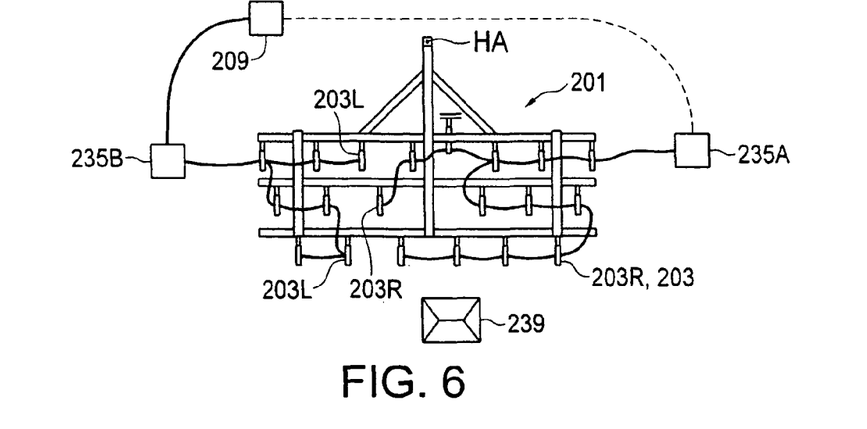
FIG. 6 is a schematic top view of an agricultural seeding implement with a plurality of the ground engaging tools of FIG. 5 laterally spaced across the width of the implement and with the system for correcting skewing of FIG. 5.

FIG. 6 shows an agricultural seeding implement 201 with a plurality of right ground engaging tool assemblies 203R on a right side of the implement, and a plurality of left tool assemblies 203L on a left side of the implement 201. Note the tools 203R are not necessarily to the right of the center of the implement 201, but are to the right of the left assemblies 203L. A distribution system 239 such as is well known in the art and only schematically indicated is operative to deposit an agricultural product into each furrow made by the furrow forming elements 202F, 202R.

The hydraulic cylinders 223 on the right tool assemblies 203R are connected to a first hydraulic source 235A and the hydraulic cylinders 223 on the left tool assemblies 203L are connected to a second hydraulic source 235B. The correction mechanism 209 is operative to increase and decrease an operating pressure of at least one of the first and second hydraulic sources, and thereby change the total drag force on the right side relative to the total drag force on the left side of the implement. The drag force change will cause the implement to pivot about the hitch axis HA to correct a detected skewed orientation of the implement 201.

It is also contemplated that some tool assemblies 203 could be located to the left of the left tool assemblies 203L, and be connected to the first hydraulic source 235A. While not particularly useful, this arrangement could still allow the relative drag forces on the right side of the machine to changed relative to those on the left, which change can be used to correct a skewed orientation.

Similar arrangements are contemplated where at least some assemblies 203L on the left side are connected to a different hydraulic source than at least some assemblies 203R on the right side of the implement.

Depth of ground penetration PF, PR of the front and rear furrow forming elements 202F, 202R is determined by the a combination of the height FH of the frame with respect to the ground, and the vertical relationship of the packer wheel 233 and the furrow forming elements 202F, 202R, which can typically be adjusted by an adjustment mechanism 236. Typically these furrow opener assemblies with front and rear shanks are used to deposit fertilizer in the furrow made by the front furrow forming element and seed in the furrow made by the rear furrow forming element, but can be the other way around if more suited to some conditions.

The correction mechanism can also be operative to increase and decrease the frame height FH, in a manner for example as described above with respect to FIG. 1. As the frame 221, and thus the front end of the trailing arm 231, move up or down the depth of penetration PF, PR of the furrow forming elements 202F, 202R will vary as well, changing drag forces. It can be seen from the geometry of the assembly that when increasing or decreasing the frame height FH the front furrow forming element 202F moves up and down to a greater degree than the rear furrow forming element 202R. Since fertilizer depth is not as critical as seeding depth, providing such a correction mechanism could be advantageous in a seeding implement.

Figure 7:
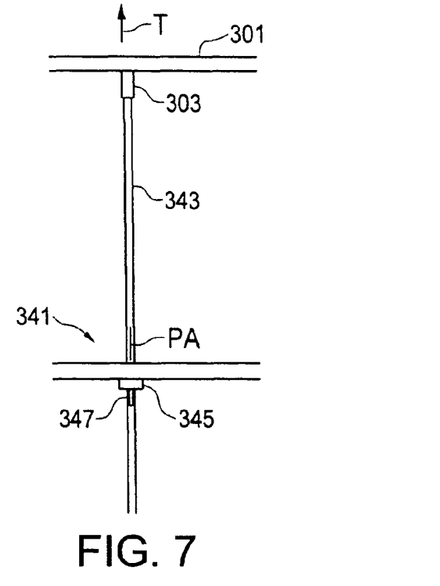
FIG. 7 is a schematic top view of an agricultural implement with a furrow forming ground engaging tool on a front portion thereof, and an embodiment of a skew detecting apparatus of the present invention mounted thereon, where the implement is shown travelling in a desired un-skewed orientation.
Figure 8:
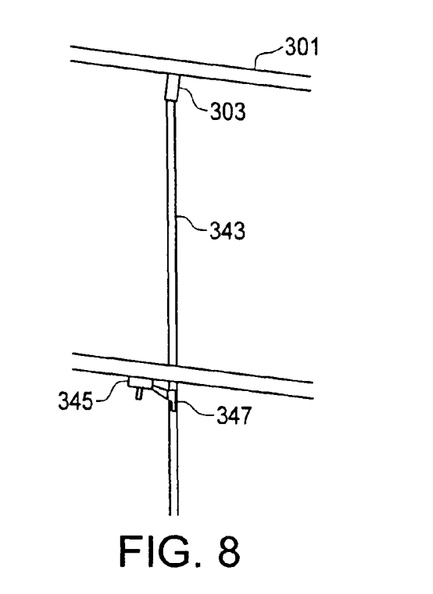
FIG. 8 is a schematic top view of the agricultural implement and skew detecting apparatus where the implement is shown travelling in a skewed orientation.
Figure 9:
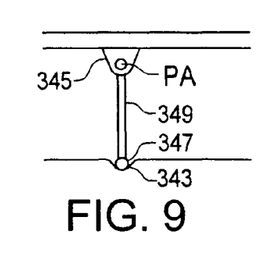
FIG. 9 is a schematic rear view of the embodiment and orientation of FIG. 7.
Figure 10:
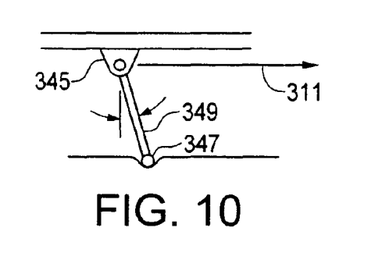
FIG. 10 is a schematic rear view of the embodiment and orientation of FIG. 8.

An apparatus 341 for detecting skewing in an agricultural implement is schematically illustrated in FIGS. 7-10. The implement 301 includes a ground engaging tool 303 mounted on a front portion thereof and operative to create a furrow 343 in a ground surface. Ground engaging tools such as furrow opener, cultivating blades, and the like typically form a furrow of some greater or less degree of definition in the soil surface. The skew detecting apparatus 341 comprises a furrow sensor 345 mounted on a rear portion of the implement 301 rearward of the ground engaging tool 303 such that when the implement 301 is travelling in a desired operating orientation, as illustrated in FIGS. 7 and 9, the furrow sensor 345 is in an aligned position where the furrow sensor 345 is aligned in an operating travel direction T of the implement 301 with the front furrow opener 303. The furrow sensor 345 is operative to detect the furrow 343 and send a skew correction signal 311 when the furrow sensor 345 detects a skewed orientation as illustrated in FIGS. 8 and 10 where the rear portion of the implement 301 is laterally displaced from the furrow 343 compared to the aligned position.

In the apparatus 341 shown in FIGS. 7-10 the furrow sensor 345 comprises a member 347 such as a skid, wheel, or the like that is configured to follow the furrow 343. The member 347 is mounted on the bottom end of a sensor arm 349 that is pivotally attached to the rear portion of the implement 301 about a substantially horizontal pivot axis PA oriented substantially in alignment with the operating travel direction. The correction signal 311 is generated by pivotal movement of the sensor arm 349 about the pivot axis PA, from a perpendicular orientation when the implement 301 is moving desired operating orientation illustrated in FIGS. 7 and 9, to a non perpendicular orientation illustrated in FIGS. 8 and 10.

Thus the apparatus 341 for detecting skewing requires only a single furrow sensor 345 located rearward of a ground engaging tool 303. Most implements are lengthy enough to allow a significant distance between the ground engaging tool and the sensor 345 so that a small degree of skew generates a considerable deviation of the sensor from the furrow, and thus can provide accurate generation of a correction signal where the degree of skew is relatively small.

Figure 11:
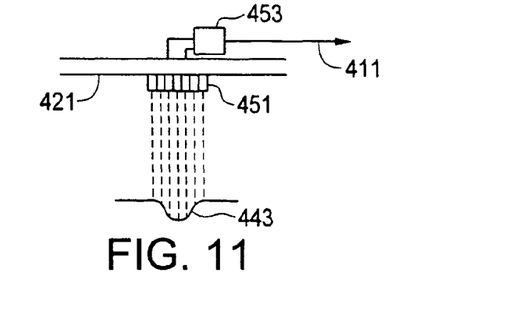
FIG. 11 is a schematic rear view of an alternate furrow sensor for use with the skew detecting apparatus of FIG. 8.

It is contemplated that there would be numerous suitable mechanism to provide the required furrow sensing function. FIG. 11 schematically shows a furrow sensor 445 comprising a lateral array of radar or sonar distance sensors 451 located to sense the distance from the implement frame 421 to the ground at a lateral array of points across the furrow and this information is read by a comparator 453 that reads a profile showing the furrow 443. As the furrow 443 moves laterally, the comparator sees that movement, and sends the correction signal.

Figure 12:
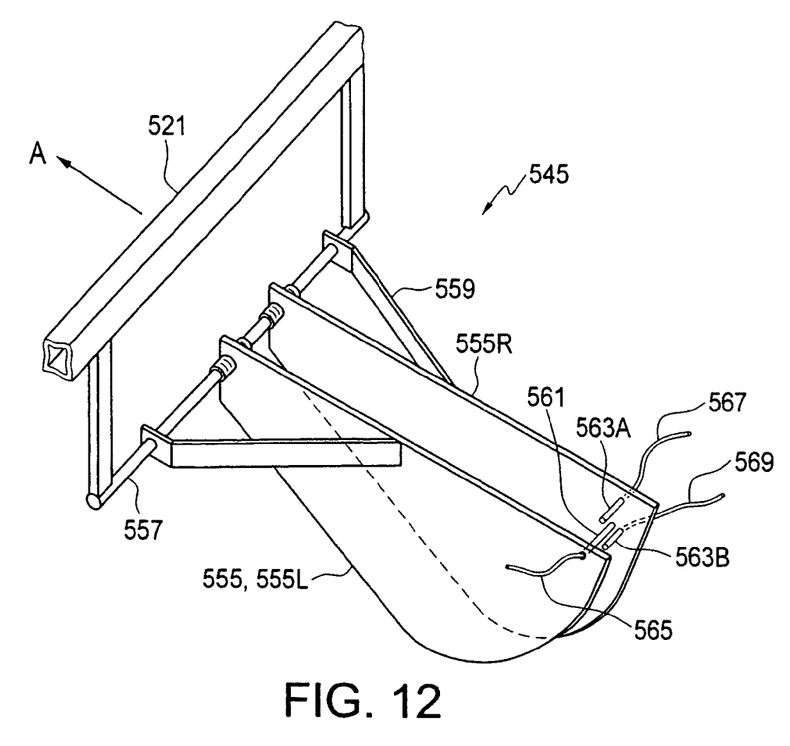
FIG. 12 is a schematic perspective view of a further alternate furrow sensor for use with the skew detecting apparatus of FIG. 8.
Figure 13:
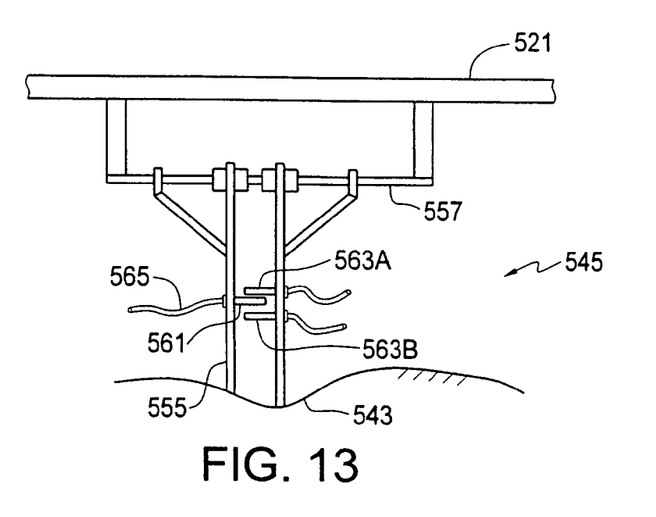
FIG. 13 is a schematic rear view of the furrow sensor of FIG. 12.

Similarly FIGS. 12 and 13 illustrate a further alternate furrow sensor 545 comprising first and second laterally spaced sensing elements adapted to ride along the ground, each of which may move vertically independently of the each of which may move vertically independently of the other and wherein the correction signal 511 is generated by vertical movement of one sensing element relative to the other.

The sensing elements, sensor plates 555 are mounted to the implement frame 521 on a pivot shaft 557 oriented substantially horizontally and perpendicular to the operating travel direction such that the sensor plates 555 may pivot up and down independently. Lateral supports 559 are attached to the sensor plates 555 and pivotally attached to the pivot shaft 557 in order to maintain the proper orientation of the sensor plates 555 aligned with the operating travel direction T. The sensor plates 555 may be positioned at the proper point along the pivot shaft 557 so sensor plates are aligned in the operating travel direction with the front ground engaging tool. Instead of sensor plates 555, a disc or wheel on an arm could also provide the required function.

A first contact element 561 extends from the left sensor plate 555L in the direction of the right sensor plate 555R. Upper and lower second contact elements 563A, 563B extend from the right sensor plate 555R in the direction of the left sensor plate 555L and are arranged such that when the left sensor plate 555L moves up relative to the right sensor plate 555R, the first contact element 561 comes in contact with the upper second contact element 563A and such that when the left sensor plate 555L moves down relative to the right sensor plate 555R, the first contact element 561 comes in contact with the lower second contact element 563B. Power is supplied to the first contact element 561 through wire 565.

As illustrated in FIG. 13, the furrow 543 is a depression in the soil and when the rear end of the implement moves laterally the furrow sensor 545 moves laterally with respect to the furrow 543 as illustrated, the left sensor plate 555L moves up relative to the right sensor plate 555R, causing the first contact element 561 to come in contact with the upper second contact element 563A, sending a correction signal through the wire 567 to a skew correction system (not shown). An opposite correction signal indicating a skew in the opposite direction is sent from the lower second contact element 563B through the other wire 569 when the furrow 543 deviates in the opposite direction.

As described above and illustrated generally in FIGS. 1-3, the invention also discloses a method of correcting skewing in an agricultural implement 1 where the implement includes a plurality of ground engaging tools 3 laterally spaced across a width of the implement 1, and where the ground engaging tools 3 are operative to selectively engage the ground 5 to perform a desired operation on a field surface. The method comprises engaging the ground engaging tools 3 in the ground 5 to perform the desired operation such that a drag force DF is exerted on the ground engaging tools 3 by engagement with the ground 5, and detecting when the implement 1 is travelling in a skewed orientation, such as is illustrated in FIG. 3, and sending a correction signal 11 indicating the skewed orientation, and in response to receiving the correction signal 11, changing the drag forces DF exerted on at least some ground engaging tools on one side of the implement 1 to correct the skewed orientation and again attain the desired orientation of FIG. 2.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A system for correcting skewing in an agricultural implement where the implement includes a plurality of ground engaging tools laterally spaced substantially evenly across a width of the implement and operative to selectively engage the ground to perform a desired operation on a field surface, the system comprising:
a skew detecting device operative to sense when the implement is travelling in a skewed orientation and send a correction signal indicating the skewed orientation to a correction mechanism;
wherein the correction mechanism is operative to vary a depth of ground penetration of at least some ground engaging tools on one side of the implement to to correct the skewed orientation.

2. The system of claim 1, wherein the depth of ground penetration of the ground engaging tools on the implement is adjusted by adjusting a height of a frame of the implement with respect to the ground, and wherein the correction mechanism is operative to raise and lower the implement frame on at least one side of the implement.

3. The system of claim 1 wherein the depth of ground penetration of the ground engaging tools on the implement is adjusted by adjusting a height of the ground engaging tools with respect to a frame of the implement, and wherein the correction mechanism is operative to raise and lower ground engaging tools with respect to the implement frame on at least one side of the implement.

4. The system of claim 1 wherein at least one ground engaging tool is movably mounted to the implement, and a bias element is operative to exert a downward bias force between the implement and the at least one ground engaging tool to force the at least one ground engaging tool into the ground, and wherein the correction mechanism is operative to increase and decrease the bias force.

5. The system of claim 4 wherein the at least one ground engaging tool comprises a tool assembly with a trailing arm pivotally attached to the implement at a front end thereof, a packer wheel mounted on a rear end of the trailing arm, and a furrow opener mounted on the trailing arm forward of the packer wheel, and wherein the bias element is operative to exert the downward bias force on the trailing arm.

6. The system of claim 5 wherein the implement comprises a plurality of right tool assemblies mounted on the implement, and a plurality of left tool assemblies mounted on the implement to the left of the right tool assemblies, and wherein the bias elements comprise hydraulic cylinders, and wherein the hydraulic cylinders on the right tool assemblies are connected to a first hydraulic source and the hydraulic cylinders on the left tool assemblies are connected to a second hydraulic source, and wherein the correction mechanism is operative to increase and decrease an operating pressure of at least one of the first and second hydraulic sources.

7. The system of claim 1 wherein the skew detecting device comprises a sensor mounted on a rear portion of the implement rearward of a front ground engaging tool and aligned with the front ground engaging tool in an operating travel direction of the implement, wherein the sensor is operative to detect a furrow formed by the front ground engaging tool at a sensing location rearward of the front ground engaging tool and send the correction signal when the sensor detects that the furrow at the sensing location is skewed with respect to the front ground engaging tool.

8. An agricultural seeding implement apparatus comprising:
- an agricultural seeding implement comprising a plurality of furrow opener assemblies laterally spaced substantially evenly across a width of the implement and operative to selectively engage the ground such that the furrow opener assemblies form furrows in the ground, and a distribution system operative to deposit an agricultural product into each furrow;
- a skew detecting device operative to sense when the implement is travelling in a skewed orientation and send a correction signal indicating the skewed orientation;
- a correction mechanism operative to receive the correction signal and operative to vary a depth of ground penetration of at least some furrow opener assemblies on at least one side of the implement to correct the skewed orientation.

9. The apparatus of claim 8 wherein the depth of ground penetration of the furrow opener assemblies on the implement is adjusted by adjusting a height of a frame of the implement with respect to the ground, and wherein the correction mechanism is operative to raise and lower the implement frame on at least one side of the implement.

10. The apparatus of claim 8 wherein the depth of ground penetration of the furrow opener assemblies on the implement is adjusted by adjusting a height of the furrow opener assemblies with respect to a frame of the implement, and wherein the correction mechanism is operative to raise and lower the furrow opener assemblies with respect to the implement frame on at least one side of the implement.

11. The apparatus of claim 8 wherein at least one furrow opener assembly comprises a furrow opener and a bias element is operative to exert a downward bias force between the implement and the furrow opener to force the furrow opener into the ground, and wherein the correction mechanism is operative to increase and decrease the bias force.

12. The apparatus of claim 11 wherein the at least one furrow opener assembly is provided by a trailing arm furrow opener assembly comprising a trailing arm pivotally attached to the implement at a front end thereof, a packer wheel mounted on a rear end of the trailing arm, and a furrow opener mounted on the trailing arm forward of the packer wheel, and wherein the bias element is operative to exert the downward bias force on the trailing arm.

13. The apparatus of claim 12 wherein the implement comprises a plurality of right trailing arm furrow opener assemblies mounted on the implement, and a plurality of left trailing arm furrow opener assemblies mounted on the implement to the left of the right tool assemblies, and wherein the bias elements comprise hydraulic cylinders, and wherein the hydraulic cylinders on the right trailing arm furrow opener assemblies are connected to a first hydraulic source and the hydraulic cylinders on the left trailing arm furrow opener assemblies are connected to a second hydraulic source, and wherein the correction mechanism is operative to increase and decrease an operating pressure of at least one of the first and second hydraulic sources.

14. A method of correcting skewing in an agricultural implement where the implement includes a plurality of ground engaging tools laterally spaced substantially evenly across a width of the implement, and where the ground engaging tools are operative to selectively engage the ground to perform a desired operation on a field surface, the method comprising:
- engaging the ground engaging tools in the ground to perform the desired operation;
- detecting when the implement is travelling in a skewed orientation and sending a correction signal indicating the skewed orientation;
- receiving the correction signal and in response, varying a depth of ground penetration of at least some ground engaging tools on one side of the implement to correct the skewed orientation.

15. The method of claim 14, comprising varying the depth of ground penetration of the at least some ground engaging tools by adjusting a height of a frame of the implement with respect to the ground on the one side of the implement.

16. The method of claim 14, comprising varying the depth of ground penetration of the at least some ground engaging tools by adjusting a height of the at least some ground engaging tools with respect to a frame of the implement.

17. The method of claim 14 wherein at least one ground engaging tool is movably mounted to the implement, and a bias element is operative to exert a downward bias force between the implement and the at least one ground engaging tool to force the at least one ground engaging tool into the ground, and comprising changing the drag force exerted on at least one ground engaging tool by increasing and decreasing the bias force.

18. The method of claim 17 wherein the at least one ground engaging tool comprises a tool assembly with a trailing arm pivotally attached to the implement at a front end thereof, a packer wheel mounted on a rear end of the trailing arm, and a furrow opener mounted on the trailing arm forward of the packer wheel, and wherein the bias element is operative to exert the downward bias force on the trailing arm.

19. The method of claim 18 wherein the implement comprises a plurality of right tool assemblies mounted on the implement, and a plurality of left tool assemblies mounted on the implement to the left of the right tool assemblies, and wherein the bias elements comprise hydraulic cylinders, and wherein the hydraulic cylinders on the right tool assemblies are connected to a first hydraulic source and the hydraulic cylinders on the left tool assemblies are connected to a second hydraulic source, and comprising changing the drag forces by increasing and decreasing an operating pressure of at least one of the first and second hydraulic sources.

20. The method of claim 14 comprising sensing a lateral position of a furrow formed by a front ground engaging tool at a sensing location rearward of and aligned with the front ground engaging tool in an operating travel direction of the implement, and sending the correction signal when the lateral position of the furrow at the sensing location deviates from an aligned position.

* * * * *